United States Patent
Aldana et al.

(10) Patent No.: US 9,699,283 B2
(45) Date of Patent: Jul. 4, 2017

(54) ELECTRONIC PORTABLE DEVICE SHELL HAVING AN INTEGRAL STAND AND STAND BRACE

(71) Applicant: BlackBerry Limited, Waterloo (CA)

(72) Inventors: Leonardo Aldana, Waterloo (CA); Luke Anthony Puccini, Oshawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/528,303

(22) Filed: Oct. 30, 2014

(65) Prior Publication Data
US 2016/0127526 A1 May 5, 2016

(51) Int. Cl.
| | |
|---|---|
| H04M 1/00 | (2006.01) |
| F16M 11/04 | (2006.01) |
| A47B 97/04 | (2006.01) |
| H04M 1/04 | (2006.01) |
| H04B 1/3888 | (2015.01) |

(52) U.S. Cl.
CPC ............ *H04M 1/04* (2013.01); *H04B 1/3888* (2013.01)

(58) Field of Classification Search
CPC .................................. A45F 5/00; H04M 1/04
USPC ........... 455/457, 575.6, 575.1; 224/217, 197, 224/585, 101; 361/679.01, 814; 379/433.12; 248/176.3, 188.6, 676, 164, 248/688, 133, 463
See application file for complete search history.

(56) References Cited

U.S. PATENT DOCUMENTS

| | | | |
|---|---|---|---|
| 7,054,441 B2 * | 5/2006 | Pletikosa | G06F 1/1626 361/679.24 |
| 8,132,670 B1 | 3/2012 | Chen | |
| 9,249,927 B2 * | 2/2016 | Graham | F16M 11/041 |
| 2006/0144884 A1 * | 7/2006 | Abbate | A45C 9/00 224/585 |
| 2010/0072334 A1 * | 3/2010 | Le Gette | F16M 11/041 248/176.3 |

(Continued)

FOREIGN PATENT DOCUMENTS

WO 2013/043465 A1 3/2013

OTHER PUBLICATIONS

European Search Report dated Apr. 7, 2016, received for European Application No. 15191208.6.

*Primary Examiner* — Kiet Doan
(74) *Attorney, Agent, or Firm* — Jon Gibbons; Fleit Gibbons Gutman Bongini & Bianco P.L.

(57) ABSTRACT

A shell is configured to attach to an electronic portable device (such as a smart phone or a pad/tablet-styled device). The shell comprises a unitary integral component having a stand that selectively moves between a deployed position and a stowed position and a corresponding stand brace that selectively moves between a deployed position and a stowed position. By one approach the stand pivots with respect to a portion of the shell that attaches to the electronic portable device and the stand brace pivots with respect to the stand. By one approach the stand and the stand brace are substantially disposed planar to one another when both are in their respective stowed positions. By one approach a free end of the stand brace contacts the electronic portable device when the stand brace is in its deployed position to thereby bias the stand towards the deployed position for the stand.

16 Claims, 5 Drawing Sheets

(56) References Cited

U.S. PATENT DOCUMENTS

| | | | |
|---|---|---|---|
| 2012/0025039 A1* | 2/2012 | Segal | F16M 11/24 |
| | | | 248/188.6 |
| 2012/0077556 A1 | 3/2012 | McKendrick | |
| 2013/0214661 A1 | 8/2013 | McBroom | |
| 2013/0271857 A1* | 10/2013 | Jaffee | H04M 1/027 |
| | | | 359/818 |
| 2014/0202887 A1 | 7/2014 | Mongan et al. | |
| 2014/0262855 A1 | 9/2014 | Gandhi et al. | |

* cited by examiner

ELECTRONIC PORTABLE DEVICE SHELL HAVING AN INTEGRAL STAND AND STAND BRACE

FIELD OF TECHNOLOGY

The present disclosure relates to electronic portable devices and more particularly to shells for such devices.

BACKGROUND

Electronic devices, including electronic portable devices, have gained widespread use and may provide a variety of functions including, for example, telephonic, electronic messaging and other personal information manager (PIM) application functions. Electronic portable devices include, for example, several types of mobile stations such as simple cellular telephones, so-called smart phones, wireless personal digital assistants (PDAs), and pad/tablet-styled computers with wireless 802.11 or Bluetooth™ capabilities.

Electronic portable devices such as pad/tablet-styled devices or smart phones are generally intended for handheld use and ease of portability. Accordingly, shells are available to attach to such a device to help protect that device from scratches, marring, and damage from inadvertent contact with other objects during handheld use or movement from one place to another.

There are times when the user may wish to use their device hands-free while observing the device's display. For example, the user may wish to watch a video on their device without holding the device. In such a case many users prefer to place the device in a substantially upright position (in either a portrait orientation or a landscape orientation) on some convenient surface such as a desk or countertop.

To facilitate such orientation, some shells include a deployable stand. Unfortunately, many such stands add considerable undesired thickness to the shell. Such stands also often require a number of additional parts that lead to increased costs, reliability concerns, and manufacturability issues.

DETAILED DESCRIPTION

Figure 1:
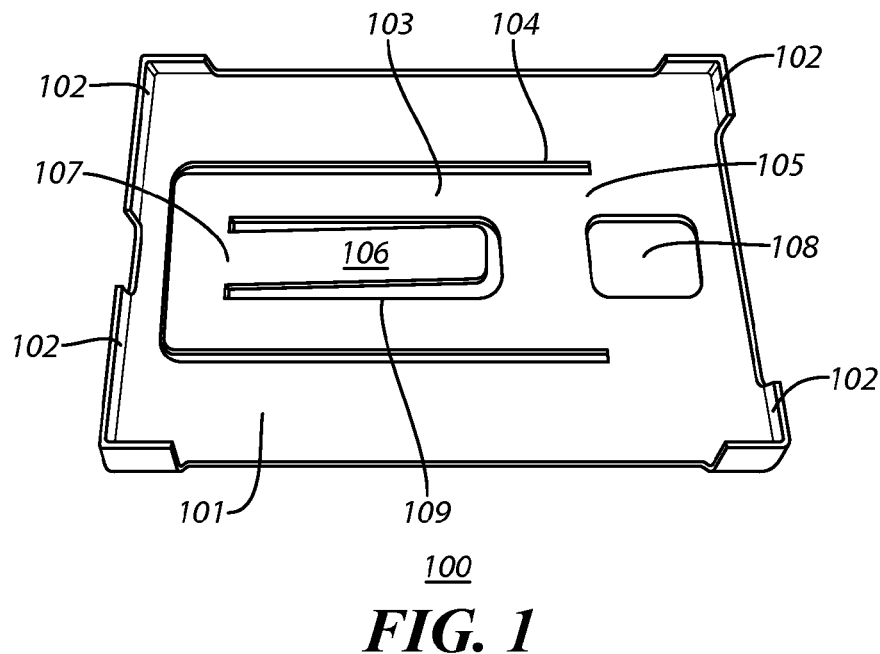
FIG. 1 is an interior perspective view of a shell in accordance with one embodiment of the disclosure.

The following describes an apparatus pertaining to a shell that is configured to attach to an electronic portable device (such as a smart phone or a pad/tablet-styled device). The shell comprises a unitary integral component having a stand that selectively moves between a deployed position and a stowed position and a corresponding stand brace that selectively moves between a deployed position and a stowed position. By one approach the stand pivots with respect to a portion of the shell that attaches to the electronic portable device and the stand brace pivots with respect to the stand.

By one approach the stand and the stand brace are substantially disposed planar to one another when both are in their respective stowed positions. So configured, both the stand and the stand brace can be adjacent to and parallel to a corresponding portion of the electronic portable device (such as a back side thereof).

By one approach a free end of the stand brace contacts the electronic portable device (either via direct physical contact or via some intermediary surface or material such as a liner of choice) when the stand brace is in its deployed position to thereby bias the stand towards the deployed position for the stand. So configured, the stand can be readily deployed and maintained in a deployed position to thereby securely maintain the electronic portable device in a desired orientation. By one approach the stand and stand brace are configured to permit such a result notwithstanding whether the electronic portable device is disposed in a portrait orientation or a landscape orientation.

These teachings are highly flexible in practice and can be readily leveraged to accommodate a variety of application settings. By one approach, for example, the aforementioned shell and its unitary integral components comprise a single molded plastic unitary integral component. As another example in these regards, by one approach a free end of the stand can be configured to conformally latch to a side of the electronic portable device when the stand is in its stowed position.

So configured, such a shell can offer the benefits of a secure stand while nevertheless maintaining a very thin profile when the stand is stowed. In fact, by one approach, when stowed both the stand and the stand brace add nothing to the overall thickness of the shell. These teachings can be implemented in a highly economical manner and will readily accommodate a wide variety of form factors and sizes to thereby accommodate a great variety of electronic portable devices.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a shell 100 configured in accordance with these teachings. This shell 100 comprises a unitary integral component comprised of a single material such as, for example, a molded plastic unitary integral component. These teachings will accommodate other possibilities in these regards. For example, the shell may be formed using co-molding techniques and hence may comprise more than one material. As one simple example in those regards, an exterior portion of the shell may be co-molded with a material having a particular color or texture selected for a particular aesthetic or functional purpose.

As noted above, the shell and other components as described herein collectively constitute a single unitary integral component. As used herein, this reference to "integral" will be understood to refer to a permanent combination and joinder that is sufficiently complete so as to consider the combined elements to be as one. Accordingly, two items would not be considered "integral" with respect to one another if they are merely connected to one another by the action of a separate and discrete holding member such as a screw, bolt, clamp, clip, or the like or if the two items are connected to one another via snaps, clips, friction, gravity, or the like.

A portion 101 of the shell 100 is configured to attach to an electronic portable device to thereby protectively cover part but not all of the electronic portable device. In this particular illustrative example the electronic portable device is presumed to be relatively rectangular, thin, and to have a substantially planar back side. Accordingly, the shell 100 is similarly rectangular and thin. This portion 101 of the shell 100 also includes, in this example, corners 102 that are configured to conform to the corners of the electronic portable device and thereby captivate the electronic portable device via a snug fit (such as a snap fit) and to thereby protectively cover at least part of the back side of the electronic portable device.

The shell 100 also includes a stand 103. In this example the stand 103 is formed and defined by a U-shaped cutout 104 formed through the material that comprises the shell 100. An imaginary line drawn across the top of the U-shaped cutout 104 forms a pivot area 105. In particular, as will be shown below in more detail, the stand 103 can pivot about this pivot area 105 with respect to the aforementioned portion 101 of the shell 100 that attaches to the electronic portable device.

In a somewhat similar manner, the shell 100 further includes a stand brace 106 that is formed and defined by a U-shaped cutout 109 that is formed through the material that comprises the stand 103. As with the stand, the stand brace 106 can pivot about a pivot area 107 at the top of the U-shaped cutout 109. As will also be shown below in more detail, the stand brace 106 can pivot about this pivot area 107 with respect to the stand 103.

These teachings will readily accommodate other features as desired. As one example in these regards, the shell 100 can include a cutout region 108. This cutout region 108 can receive and accommodate a camera lens that comprises a part of the electronic portable device for which this shell 100 is specifically designed.

Figure 2:
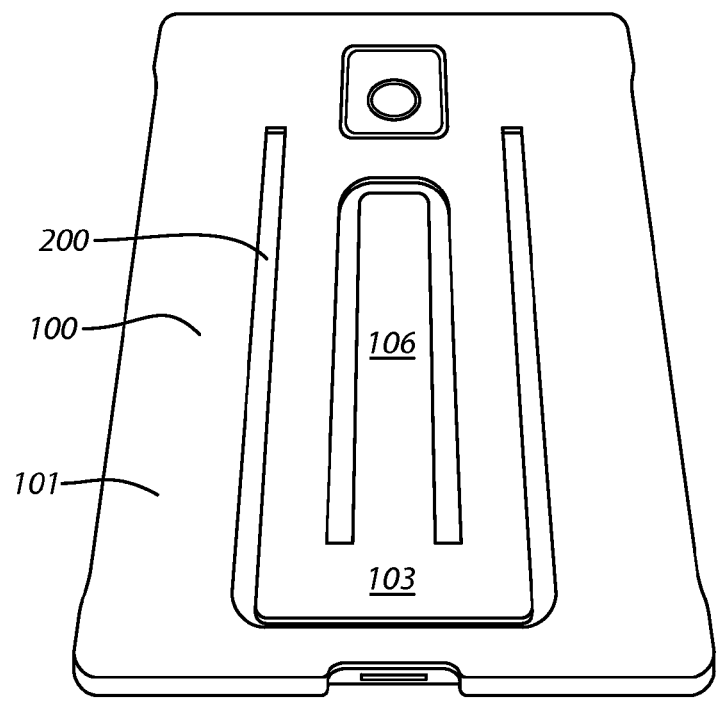
FIG. 2 is an exterior perspective view of the shell of FIG. 1.
Figure 3:
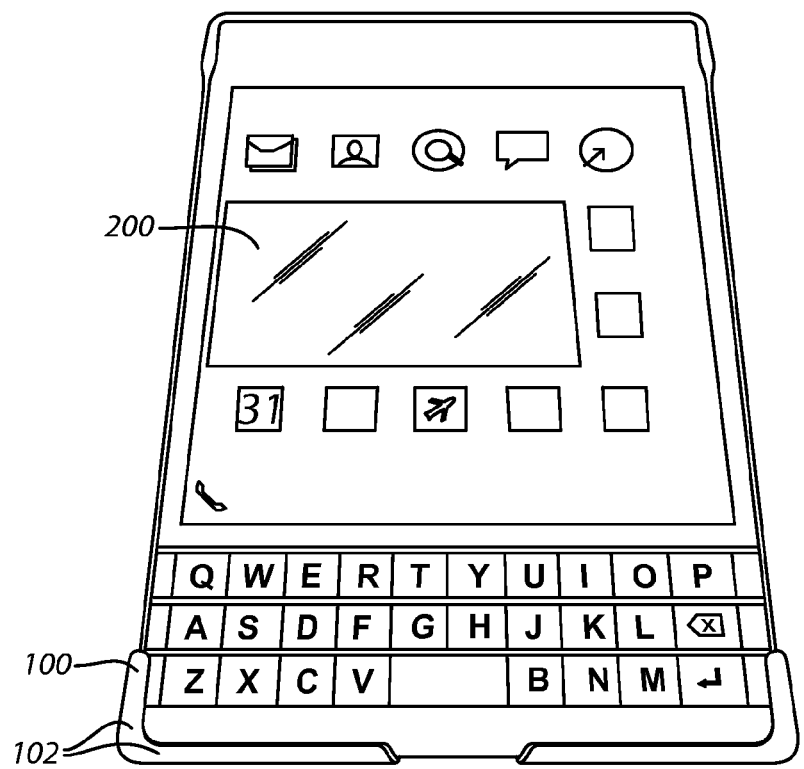
FIG. 3 is a top perspective view of the shell of FIG. 1, and showing a portion of an electronic portable device.

FIGS. 2 and 3 present the above-described shell 100 as attached to an electronic portable device 200. In particular, the shell 100 attaches to the back side of the electronic portable device 200. Configured as described above, the shell 100 attaches to the electronic portable device 200 at the corners thereof and otherwise avoids occluding any other part of the front side of the electronic portable device 200.

Referring particularly to FIG. 2, the stand 103 and stand brace 106 are shown in their stowed positions. In this state both the stand 103 and the stand brace 106 are substantially coplanar to one another and are also substantially parallel to and adjacent to the back side of the electronic portable device 200. These components 103 and 106 are also coplanar with the surrounding adjacent portions of the shell 100. Accordingly, it can be seen that the stand 103 and stand brace 106 do not add any respective thickness whatsoever to the shell 100.

Figure 4:
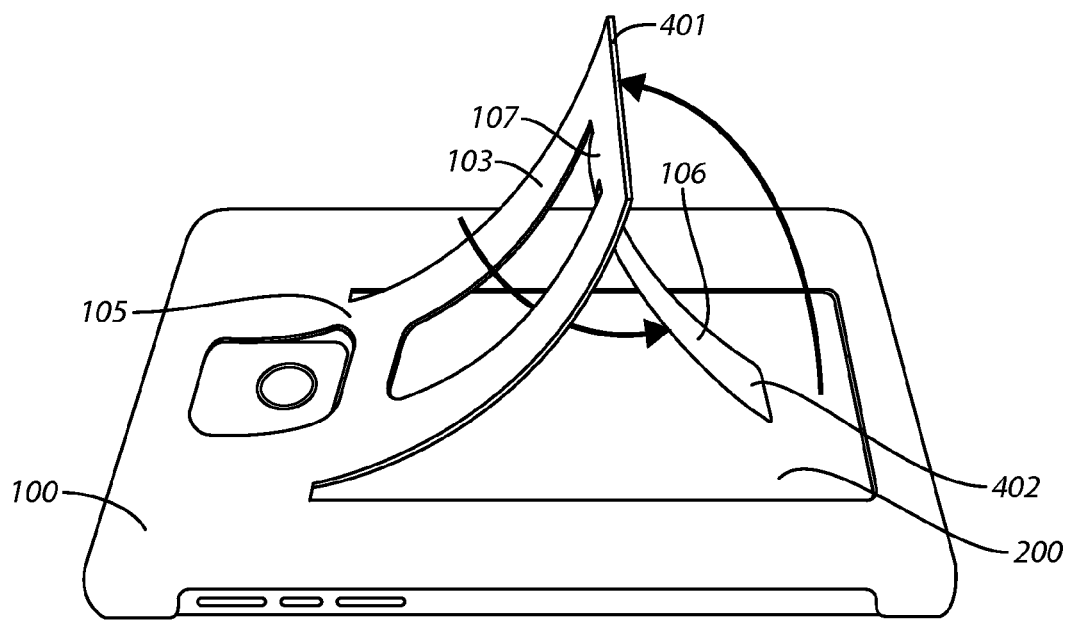
FIG. 4 is a back perspective view of the shell of FIG. 1.

FIG. 4 presents the stand 103 and stand brace 106 in their respective deployed positions. In particular, and as denoted in part by the arrows, the stand 103 has been pivoted away from the shell 100 and the electronic portable device 200 and the stand brace 106 has been pivoted away from the stand 103. In particular, the free end 401 of the stand 103 has been pivoted away from the shell 100 such that the stand assumes an arcuately curved shape. Similarly, the free end 402 of the stand brace 106 has been pivoted away from the free end 401 of the stand 103 such that the stand brace 106 also assumes an arcuately curved shape.

FIG. 4 also illustrates that the free end 402 of the stand brace 106 contacts the back side of the electronic portable device 200. This positioning, and the arcuate shape of the stand brace 106, causes the stand brace 106 to bias the stand 103 towards the depicted deployed position for the stand 103. More particularly, the reactive force created by flexing these components as described prevents the stand brace 106 from flexing out and keeps the stand brace 106 in place against the electronic portable device 200. The stand 103 and the stand brace 106 are generally stable and secure in these deployed states and will therefore remain so deployed until a user moves and manipulates these two components to permit the stand 103 and the stand brace 106 to reverse-pivot and reassume their stowed positions.

Figure 5:
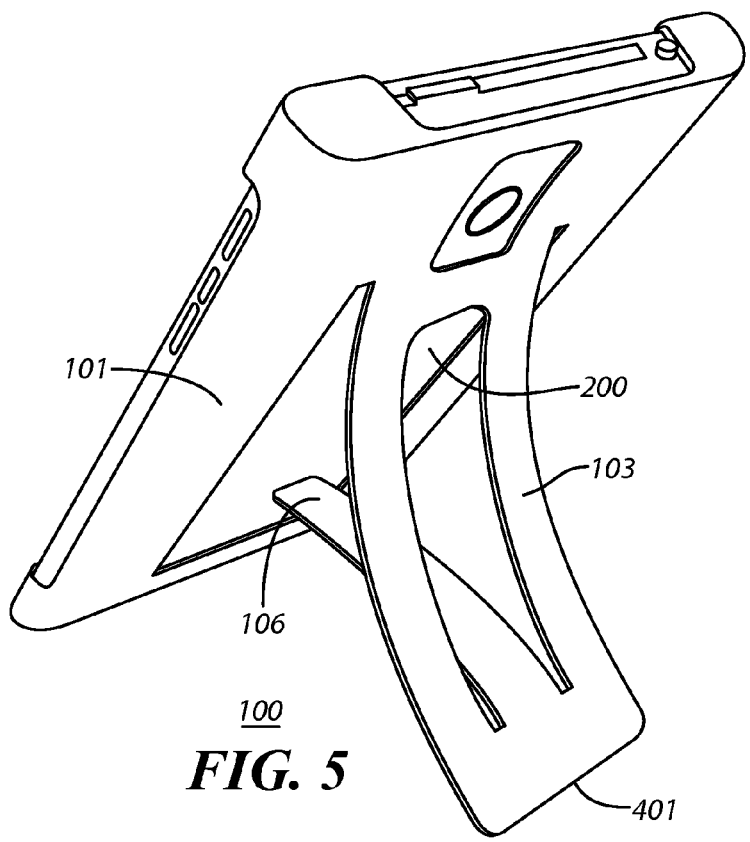
FIG. 5 is another back perspective view of the shell of FIG. 1.
Figure 6:
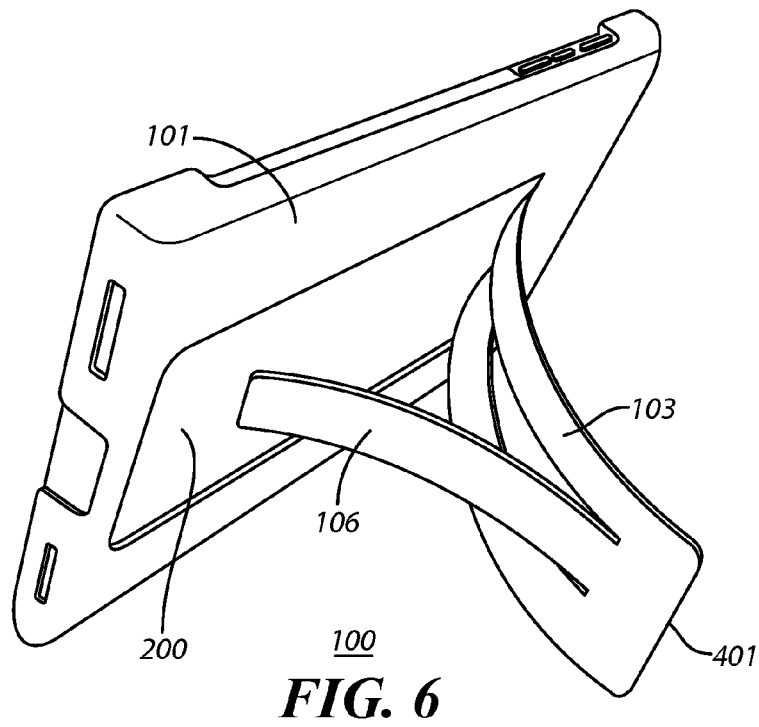
FIG. 6 is yet another back perspective view of the shell of FIG. 1.

FIG. 5 illustrates that the stand 103 will readily support the electronic portable device 200 in a substantially upright position when the stand 103 is in the deployed position and when the electronic portable device 200 is disposed in a portrait orientation. FIG. 6 illustrates that the stand 103 will also readily support the electronic portable device 200 in a substantially upright position when the stand 103 is in the deployed position and the electronic portable device 200 is disposed in a landscape orientation. Accordingly, the stand 103 (in combination with the stand brace 106) will support the electronic portable device 200 in a substantially upright position when the stand 103 is in the deployed position regardless of whether the electronic portable device 200 is disposed in a portrait orientation or a landscape orientation.

Figure 7:
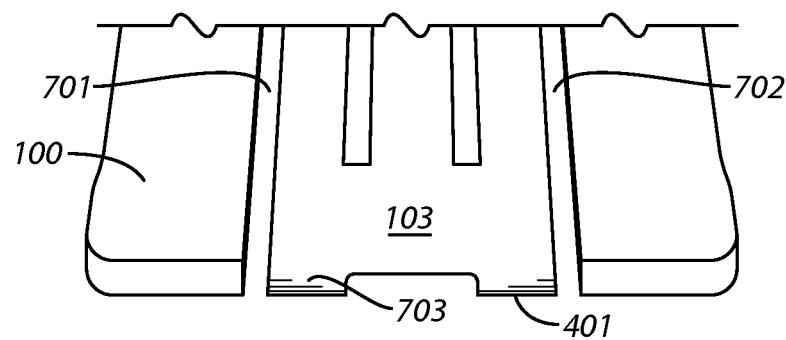
FIG. 7 is a back detail perspective view of the shell of FIG. 1.
Figure 8:
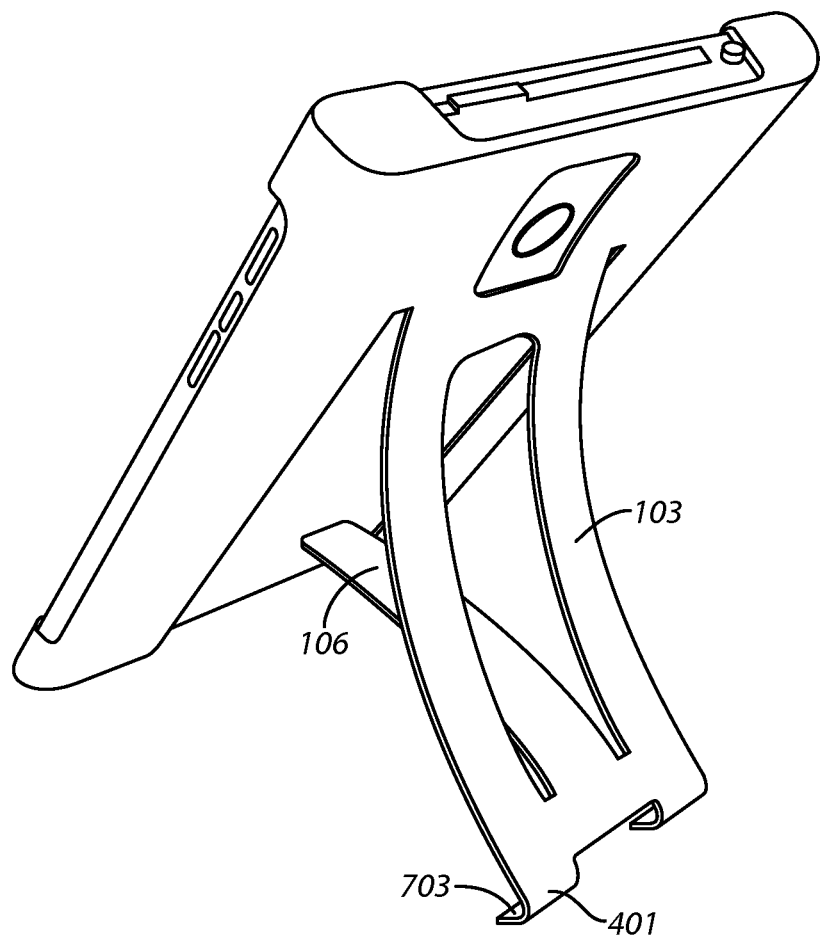
FIG. 8 is still another back perspective view of the shell of FIG. 1.

As noted above, these teachings are highly flexible in practice and will accommodate a wide variety of variations to suit various application settings and needs. FIGS. 7 and 8 present one illustrative example in these regards. In this example, the stand 103 is formed by two separate parallel cutouts 701 and 702 rather than the above-described U-shaped cutout 104. These two cutouts 701 and 702 permit the free end 401 of the stand 103 to include a lip portion 703 that will conformally latch to a side of the electronic portable device 200 as desired. This lip portion 703 will also contribute to the angle at which shell 100 positions the electronic portable device 200 (as shown in FIG. 8).

Figure 9:
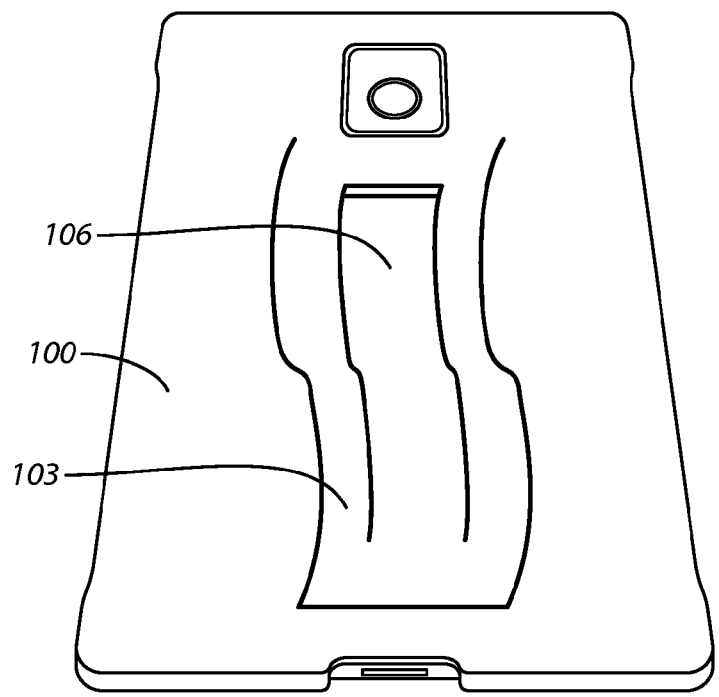
FIG. 9 is an exterior perspective view of a shell in accordance with another embodiment of the disclosure.
Figure 10:
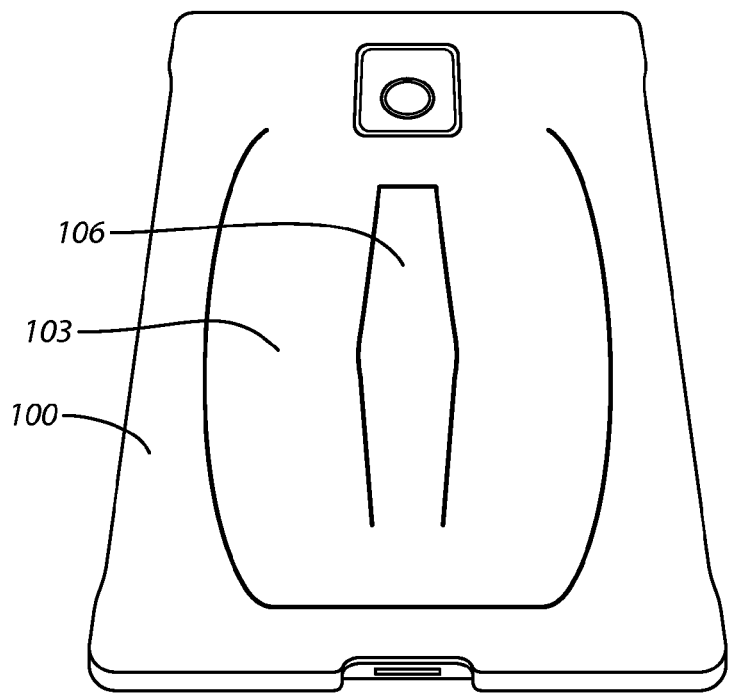
FIG. 10 is an exterior perspective view of a shell in accordance with yet another embodiment of the disclosure.

FIGS. 9 and 10 provide further examples attesting to the flexible nature of these teachings. In these illustrative examples the stand 103 and stand brace 106 are formed, at least in part, by non-linear cutout lines. This flexibility provides the designer with a nearly unlimited opportunity to create stands 103 and stand braces 106 having a variety of shapes and corresponding aesthetics.

The present disclosure may be embodied in other specific forms without departing from its essential characteristics. The described embodiments are to be considered in all respects only as illustrative and not restrictive. As one example in these regards, the stand 103 and the stand brace 106 can be molded in a half-pre-bent form to reduce the stress on the plastic during normal-use bending. Depending upon the materials employed, flat-molded components might lead to premature plastic failures due to surpassing the mechanical properties of the material (for example, the material might yield to permanent plastic deformation to thereby reduce the corresponding spring forces and render the stand function less useful) The scope of the disclosure is, therefore, indicated by the appended claims rather than by the foregoing description. All changes that come within the meaning and range of equivalency of the claims are to be embraced within their scope.

What is claimed is:

1. An apparatus comprising:
a shell made from a flexible material configured to attach to an electronic portable device at the corners thereof, the shell comprising a unitary integral component that includes:
a stand defined by a cutout through the material of the shell that can pivot about a pivot area, the stand selectively movable between a deployed position and a stowed position; and
a stand brace defined by a cutout through the material of the stand that can pivot about a second pivot area, the stand brace selectively movable between a deployed position and a stowed position,
wherein the stand is substantially planar when in its stowed position, and a free end of the stand is pivoted away from the shell when the stand is in its deployed position such that the stand assumes an arcuately curved shaped, and
wherein the stand brace is substantially planar when in its stowed position, and a free end of the stand brace is pivoted away from the free end of the stand is arcuately curved when the stand brace is in its deployed position such that the stand brace assumes an arcuately curved shaped;
wherein the stand and the stand brace are substantially coplanar when both are in their respective stowed positions; and
wherein the shell is configured to attach to a back of the electronic portable device, and wherein the stand and the stand brace are substantially parallel to and adjacent to the back of the electronic portable device when both the stand and the stand brace are in their respective stowed positions.

2. The apparatus of claim 1 wherein the shell comprises a molded plastic unitary integral component.

3. The apparatus of claim 1 wherein the stand is configured to pivot between its deployed position and the stowed position.

4. The apparatus of claim 3 wherein the stand brace is configured to pivot between its deployed position and its stowed position.

5. The apparatus of claim 4 wherein the stand brace is configured to pivot with respect to the stand proximal to a free end of the stand.

6. The apparatus of claim 5 wherein a free end of the stand brace contacts the electronic portable device when the stand brace is in its deployed position to thereby bias the stand towards the deployed position for the stand.

7. The apparatus of claim 1 wherein the stand is configured to support the electronic portable device in a substantially upright position when the stand is in the deployed position regardless of whether the electronic portable device is disposed in a portrait orientation or a landscape orientation.

8. The apparatus of claim 1 wherein a free end of the stand is configured to conformally latch to a side of the electronic portable device when the stand is in its stowed position.

9. The apparatus of claim 1 wherein the stand brace forms one leg of a y-shape and the stand forms another leg of the y-shape and the free end of the stand defines a bottom portion of the y-shape when in the deployed position.

10. A shell made from a flexible for use with an electronic portable device, the shell integrally comprising:
a first portion configured to attach to the electronic portable device at the corners thereof to thereby protectively cover part but not all of the electronic portable device;
a stand integrally pivotally connected to the first portion and being selectively movable between a deployed position and a stowed position by pivoting a free end of the stand about a pivot area; and
a stand brace integrally pivotally connected to the stand and being selectively movable between a deployed position and a stowed position by pivoting a free end of the stand brace about a second pivot area, such that the stand and the stand brace are substantially planar with one another when in their respective stowed positions,
wherein the stand brace is substantially planar when in its stowed position and is arcuately curved when in its deployed position such that the free end of the stand brace is pivoted away from the free end of the stand when the stand brace is in its deployed position, and
wherein the stand is substantially planar when in its stowed position and is arcuately curved when in its deployed position such that the free end of the stand is pivoted away from the first portion when the stand is in its deployed position;
wherein the stand and the stand brace are substantially coplanar when both are in their respective stowed positions; and
wherein the shell is configured to attach to a back of the electronic portable device, and wherein the stand and the stand brace are substantially parallel to and adjacent to the back of the electronic portable device when both the stand and the stand brace are in their respective stowed positions.

11. The shell of claim 10 wherein the electronic portable device has a substantially planar back and wherein the first portion of the shell is configured to protectively cover at least part of the back of the electronic portable device.

12. The shell of claim 10 wherein the shell comprises a molded plastic component.

13. The shell of claim 10 wherein the first portion is configured to attach to the electronic portable device via a snap fit.

14. An apparatus comprising:
a shell made from a flexible material configured to attach to an electronic portable device at the corners thereof, the shell comprising a unitary integral component that includes:
a stand formed and defined by a U-shaped cutoff formed through the flexible material of the shell, wherein a top of the U-shaped cutoff forms a pivot area, the stand selectively movable between a deployed position and a stowed position by pivoting about the pivot area: and
a stand brace formed and defined by a second U-shaped cutoff formed through the flexible material of the stand, wherein a top of the second U-shaped cutoff forms a second pivot area, the stand brace selectively movable between a deployed position and a stowed position by pivoting about the second pivot area,
wherein the stand is substantially planar when in its stowed position and is arcuately curved when in its deployed position;
wherein the stand and the stand brace are substantially coplanar when both are in their respective stowed positions; and wherein the shell is configured to attach to a back of the electronic portable device, and wherein the stand and the stand brace are substantially parallel to and adjacent to the back of the electronic portable device when both the stand and the stand brace are in their respective stowed positions.

15. The apparatus of claim 14, wherein the stand brace is substantially planar when in its stowed position and is arcuately curved when in its deployed position.

16. The apparatus of claim 14, wherein the stand and the stand brace flex as they are moved between the deployed position and the stowed position.

* * * * *